Z. A. FERREL.
ACETYLENE GAS GENERATOR.
APPLICATION FILED NOV. 13, 1908.
940,384. Patented Nov. 16, 1909.
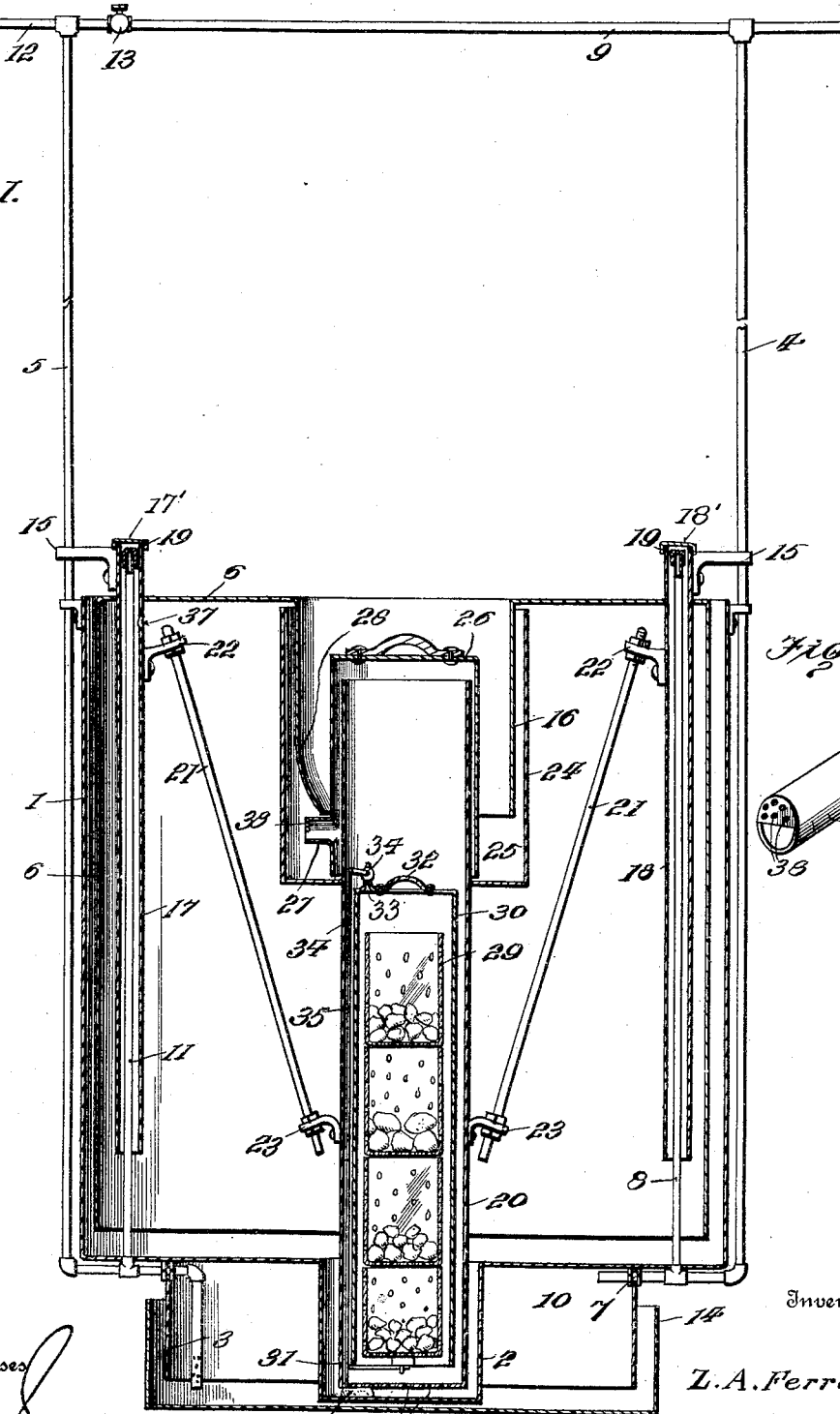

UNITED STATES PATENT OFFICE.

ZIBA A. FERREL, OF OSKALOOSA, IOWA.

ACETYLENE-GAS GENERATOR.

940,384.  Specification of Letters Patent.  Patented Nov. 16, 1909.

Application filed November 13, 1908. Serial No. 462,491.

*To all whom it may concern:*

Be it known that I, ZIBA A. FERREL, citizen of the United States, residing at Oskaloosa, in the county of Mahaska and State of Iowa, have invented certain new and useful Improvements in Acetylene-Gas Generators, of which the following is a specification.

The present invention is designed to supply an improved machine for generating gas from calcium carbid.

The invention aims to provide a machine of the type aforesaid which may be operated in safety and is economical, the carbid being preserved when the machine is not required to generate gas for immediate consumption.

The invention also has for its object to devise a novel construction, which will admit of the machine being quickly charged or supplied with carbid after that previously placed in position has become spent or used.

For a full understanding of the invention and the merits thereof and also to acquire a knowledge of the details of construction and the means for effecting the result, reference is to be had to the following description and accompanying drawing, in which:

Figure 1 is a vertical central section of a machine embodying the invention; and, Fig. 2 is a perspective view of an end portion of the nozzle on a larger scale.

Corresponding and like parts are referred to in the following description and indicated in the views of the drawing by the same reference characters.

The tank 1 is provided centrally of its bottom with a pit 2 and near its outer edge with a pendent flange 3. Guides 4 and 5 are provided at opposite sides of the tank and serve to direct the gas bell 6 in its vertical movements. The guides 4 and 5 are tubular and are utilized in the manner hereinafter described for conveying the gas to a desired point. The pipe or guide 4 communicates at its lower end with the upper portion of the flange 3 at 7 and also connects with a vertical pipe 8 which forms an overflow or relief for any excessive pressure. The pipe 4 connects at its upper end with a pipe 9 which opens into the air, so as to discharge any excess of gas that may generate. The pipe 5 extends through the upper portion of the flange 3 and passes into the chamber 10 inclosed by said flange 3 and extends to within a short distance of bottom of said chamber. A vertical pipe 11 connects with the upper portion of the tank 1 and conveys the gas therefrom. The service pipe 12 connects with the upper portion of the pipe 5 and with the pipe 9, a valve 13 serving to cut off communication between the pipes 12 and 9. A pan 14 receives the pendent flange 3 and the pit or chamber 2 of the tank 1. Water is supplied to the pan 14, so as to make a seal between the flange 3 and the pan 14, thereby preventing the escape of any gas.

The gas bell 6 fits loosely within the tank 1 and is free to move vertically therein and is provided with guide members 15 which coöperate with the guides 4 and 5 to direct the bell in its vertical movements. The top of the gas bell 6 is provided centrally with an opening from which a flange 16 is pendent. Tubular casings 17 and 18 are secured near their upper ends to the top of the gas bell at opposite points and receive the respective pipes 11 and 8, said tubular casings extending to within a short distance of the lower end of the gas bell, and their other ends projecting some distance above the top of the bell to accommodate the upper ends of the pipes inclosed thereby. The tank 1 is nearly or quite filled with water which extends to about the same level within as without the bell when the latter is at its lowest position, said water forming a liquid seal between the bell and tank and between the tubular casings 17 and 18 and the respective pipes 11 and 8 inclosed thereby. Each of the pipes 11 and 8 is provided at its upper end with a cap 19 having an opening in the top thereof and a less diameter than the opening through the pipes, so as to prevent siphoning of the tank when the machine is not in operation.

The generator is suspended within the bell 6 and is movable vertically therewith. The generator comprises a receptacle 20 which is located centrally within the gas bell and is open at the top and closed at the bottom, the latter having one or more apertures 21ª for the ingress and egress of the water. The receptacle 20 is suspended within the gas bell in any manner, and as shown rods 21 are employed and are connected at their upper end to brackets 22 attached to the upper portion of the gas bell, and at their lower ends to brackets 23 secured to opposite sides of the receptacle 20, said rods 21 having opposite end portions threaded and receiving pairs of nuts which embrace opposite sides of the respective brackets, thereby admitting of the generator being adjusted vertically and being easily removed when required for any purpose. A shell 24 surrounds the upper portion of the receptacle 20 and incloses an annular space 25 into which the flange 16 extends, said space 25 being nearly or quite filled with water to form a liquid seal between the flange 16 and the upper portion of the receptacle 20 and the shell 24. A cover 26 is fitted to the upper portion of the receptacle 20 encircled by the shell 24 and may be held in place by suitable fastening means, so as to prevent displacement by pressure from within. A nozzle 27 projects laterally from the lower portion of the cover 26 and is adapted to engage under a passage formed by a projecting portion 28 of the flange 16. The nozzle 27 performs the dual office of securing means in conjunction with the projection 28 to retain the cover 26 in place and as an outlet for the gas from the generator. It is to be understood that ample space exists between the upper portion of the receptacle 20 and the cover 26 for the passage of gas from the generator to the nozzle 27. Sufficient space also exists between the flange 16 and the shell 24 for the passage of gas upward from the nozzle 27 into the upper portion of the gas bell.

The calcium carbid is placed in a series of baskets or cans 29 which are placed one upon the other within a holder 30, the latter in turn being placed within the receptacle 20. The holder 30 consists of a cylindrical casing closed at its upper end and open at its lower end and of a size to receive a number of the baskets or cans 29. A suitable catch or fastening means 31 is employed for retaining the baskets or cans within the holder. A handle 32 is fitted to the upper end of the holder 30 for convenience in removing the same from the generator or placing it in position. An outlet 33 is provided at the upper end of the holder 30 for the escape of the gas therefrom. This outlet may be of a size to admit of the passage of a quantity of gas to supply all the burners that may be connected with the service pipe 12. The outlet 33 may be controlled by means of a valve 34 which may be automatic in operation or adapted to be set by hand. When the outlet 33 is designed to be automatically controlled by means of the valve 34, a connection 35 extends downward from a handle of the valve 34 with its lower end extending through one of the perforations 21$^a$ for attachment to a weight 36, which latter normally rests upon or is in contact with the bottom of the pit 2, so that when the gas bell rises to an elevation to lift the weight 36 or carry a like part away from the bottom of the pit 2, the valve 34 will automatically close and thereby prevent gas passing therethrough into the upper portion of the receptacle 20.

An opening 37 is provided in a side of the tubular casing 17 at or near the top of the gas bell for the out flow of gas from the latter into the casing 17, thence into the supply pipe 11 and into the pipe 5 and service pipe 12. The outer end of the nozzle 27 is provided with a web 38 which is supplied with a series of minor openings, said web covering the upper portion of the nozzle. This arrangement results in an escape of the gas in a series of minute jets and insures the same coming in contact with the water contained in the shell 24, whereby impurities are removed and the gas thoroughly washed. In the event of the openings in the web becoming filled the gas passes downward around the lower edge of said web and thence upward into the projection 28.

In the practical operation of the invention, the parts are assembled substantially as herein disclosed. The holder 30 charged in the manner set forth is inserted within the upper portion of the receptacle 20 and lowered therein, the cover 26 having been previously removed. As the holder 30 is lowered into the receptacle 20 the water in said receptacle is forced downward through the openings 21$^a$. The outlet 33 may be closed or if left open is of such relative size as to permit the air to escape slowly from the holder, hence the latter is prevented from being flooded. After the holder 30 is inserted within the receptacle 20 the cover 26 is placed in position and secured preferably by turning the cover to bring the nozzle 27 beneath the projection 28.

When the water reaches a height in the lower portion of the holder 30 to pass through the lowermost basket or can 29, gas is generated in the well known manner and passes upward into the holder and out through the outlet 33, thence into the upper portion of the receptacle 20, down through the space between the cover 26 and the upper portion of said receptacle, out through nozzle 27 into the passage between projection 28 and part 24, upward through the water between the parts 16 and 24 into the upper part of the gas bell thence through the opening 37 into the casing 17 and through pipes 11 and 5 into the service pipe 12 and to the burners or outlets connected therewith. The surplus gas causes the gas bell 6 to rise and any excessive generation of gas finds an escape into the lower end of the tubular casing 18 thence outward through the pipes 8, 4 and 9 to the required point of discharge. The resistance to the passage of the gas offered by the liquid seal in the shell 24 serves to prevent water entering the openings 21$^a$ and flooding the generator, but when the generator descends and the upward pressure of the water in the tank 1 exceeds the resistance offered by the water in the shell 24, a small portion of the water passes from the tank through the openings 21ª into the receptacle 20 thence into the holder until the unused carbid is reached and gas is generated, when the bell will again rise and the further increase of water through the openings 21ª be prevented. Any moisture contained in the gas and condensed in the pipes 4 and 5 finds its way into the chamber 10. By having the lower portion of the pipe 5 dipped into the water contained in the chamber 10 gas is prevented from escaping through the pipe 4. By opening the valve 13 gas generated in the machine may readily escape through the pipe 9.

Having thus described the invention, what is claimed as new is:

1. In an acetylene gas generator the combination of a gas bell having an opening and provided with a flange pendent from said opening, a receptacle located within the gas bell, a shell surrounding the upper portion of the receptacle and said pendent flange and adapted to receive a quantity of water to form a liquid seal, a carbid holder arranged within the receptacle, and a cover fitted over the upper portion of the receptacle and having a lateral nozzle at its lower end to deliver the gas into the space formed between the said shell and the pendent flange.

2. In an acetylene gas generator the combination of a gas bell having an opening in its top and a flange pendent from said opening, said flange having a portion pressed inward therefrom to form a projection, a receptacle arranged within the gas bell, a shell surrounding the upper portion of said receptacle and the said pendent flange and adapted to contain a quantity of water to form a liquid seal, a carbid holder arranged within said receptacle, and a cover fitted upon the upper portion of said receptacle and having a lateral nozzle near its lower end to extend beneath the said projecting portion of the pendent flange.

3. In an acetylene gas generator the combination of a gas bell having a pendent flange, a generator arranged within the gas bell and movable therewith and comprising a receptacle, and a cover for the upper portion of said receptacle, having a lateral nozzle for the escape of the gas, said nozzle having the upper portion provided with a web in which a series of small openings are formed.

In testimony whereof I affix my signature in presence of two witnesses.

ZIBA A. FERREL. [L. S.]

Witnesses:
LENA L. ROWE,
JOHN F. LACEY.